United States Patent
Suryanarayana et al.

(10) Patent No.: US 11,880,908 B2
(45) Date of Patent: *Jan. 23, 2024

(54) SYSTEM AND METHOD FOR PRE-BOOT DYNAMIC VIDEO RENDERING AND GRAPHICS INTERPRETATION BY A VIRTUAL GRAPHICS BROWSER

(71) Applicant: DELL PRODUCTS, LP, Round Rock, TX (US)

(72) Inventors: Shekar Babu Suryanarayana, Bangalore (IN); Maruti Fulsing Chavan, Belgaum (IN); Virupakshi Channagiri Manjunath, Bangalore (IN); Yasaswi Saisriram Bhimaraju, Ongole (IN); Annappa Kumar Mn, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 36 days.

This patent is subject to a terminal disclaimer.

(21) Appl. No.: 17/543,968

(22) Filed: Dec. 7, 2021

(65) Prior Publication Data
US 2022/0092727 A1 Mar. 24, 2022

Related U.S. Application Data

(63) Continuation of application No. 16/891,590, filed on Jun. 3, 2020, now Pat. No. 11,232,537.

(51) Int. Cl.
*G06T 1/60* (2006.01)
*G06F 9/4401* (2018.01)

(52) U.S. Cl.
CPC .............. *G06T 1/60* (2013.01); *G06F 9/4401* (2013.01)

(58) Field of Classification Search
CPC .............................. G06T 1/60; G06F 9/4401
See application file for complete search history.

(56) References Cited

U.S. PATENT DOCUMENTS

| 7,873,807 B1 * | 1/2011 | Polyudov | G06F 9/4401 |
| | | | 711/165 |
| 9,524,390 B2 | 12/2016 | Kulkarni et al. | |

(Continued)

FOREIGN PATENT DOCUMENTS

CN 103226471 A * 7/2013

OTHER PUBLICATIONS

Soueidan ("Understanding SVG Coordinate Systems and Transformations", 2014, https://www.sarasoueidan.com/blog/svg-coordinate-systems/) (Year: 2014).*

(Continued)

*Primary Examiner* — Xin Sheng
(74) *Attorney, Agent, or Firm* — Larson Newman, LLP

(57) ABSTRACT

An information handling system is configured, during a pre-extensible firmware interface initialization phase of the information handling system, to learn capabilities of components of the information handling system, create a hand-off block for storage of a virtual graphical browser firmware volume payload, and store learned capabilities of the components of the information handling system in the hand-off block. During a driver execution environment phase, the information handling system may retrieve the learned capabilities of the components of the information handling system stored in the hand-off block, publish learned capabilities retrieved from the hand-off block, retrieve the virtual graphics browser firmware volume payload stored in the hand-off block, and dispatch a virtual graphics browser learning driver and a virtual graphics browser interpreter driver based on retrieved virtual graphics browser firmware volume payload. The virtual graphics browser learning (Continued)

driver may learn capabilities of a graphics library associated with the information handling system, and publish learned capabilities of the graphics library. The virtual graphics browser interpreter driver may interpret a user interface input based on published learned capabilities and published learned capabilities of the graphics library, and draw user interface elements on a screen based on interpreted user interface input.

20 Claims, 5 Drawing Sheets

(56) References Cited

U.S. PATENT DOCUMENTS

| | | | |
|---|---|---|---|
| 10,055,357 B2 | 8/2018 | Vidyadhara et al. | |
| 10,282,190 B2 | 5/2019 | Dailey | |
| 2003/0174161 A1* | 9/2003 | Wilburn | G06F 3/1423 |
| | | | 715/730 |
| 2009/0319763 A1 | 12/2009 | Zimmer et al. | |
| 2013/0080758 A1 | 3/2013 | Hentosh et al. | |
| 2015/0235030 A1 | 8/2015 | Chaiken et al. | |
| 2016/0321778 A1* | 11/2016 | Vidyadhara | G06F 9/451 |
| 2017/0024223 A1* | 1/2017 | Wynn | G06F 9/4411 |
| 2018/0357108 A1* | 12/2018 | Mullender | G06F 9/45558 |
| 2019/0354685 A1 | 11/2019 | Tomasso et al. | |

OTHER PUBLICATIONS

Martsoukos ("How to Build a Responsive Handmade SVG Form", Jan. 21, 2020, https://webdesign.tutsplus.com/tutorials/how-to-build-a-responsive-handmade-svg-form--cms-34495) (Year: 2020).*

Neumann, A. (2016). Scalable Vector Graphics (SVG). In: Shekhar, S., Xiong, H., Zhou, X. (eds) Encyclopedia of GIS. Springer, Cham. https://doi.org/10.1007/978-3-319-23519-6_1159-2 (Year: 2016).*

Soueidan ("Mimic Relative Positioning Inside an SVG with Nested SVGs", 2016 https://www.sarasoueidan.com/blog/mimic-relative-positioning-in-svg/) (Year: 2016).*

* cited by examiner

SYSTEM AND METHOD FOR PRE-BOOT DYNAMIC VIDEO RENDERING AND GRAPHICS INTERPRETATION BY A VIRTUAL GRAPHICS BROWSER

CROSS-REFERENCE TO RELATED APPLICATION

This application is a Continuation of U.S. patent application Ser. No. 16/891,590 entitled "SYSTEM AND METHOD FOR PRE-BOOT DYNAMIC VIDEO RENDERING AND GRAPHICS INTERPRETATION BY A VIRTUAL GRAPHICS BROWSER," filed on Jun. 3, 2020, the disclosure of which is hereby expressly incorporated by reference in its entirety.

FIELD OF THE DISCLOSURE

The present disclosure generally relates to information handling systems, and more particularly relates to pre-boot dynamic video rendering and graphics interpretation by a virtual graphics browser.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system is configured, during a pre-extensible firmware interface initialization phase of the information handling system, to learn capabilities of components of the information handling system, create a hand-off block for storage of a virtual graphical browser firmware volume payload, and store learned capabilities of the components of the information handling system in the hand-off block. During a driver execution environment phase, the information handling system may retrieve the learned capabilities of the components of the information handling system stored in the hand-off block, publish learned capabilities retrieved from the hand-off block, retrieve the virtual graphics browser firmware volume payload stored in the hand-off block, and dispatch a virtual graphics browser learning driver and a virtual graphics browser interpreter driver based on retrieved virtual graphics browser firmware volume payload. The virtual graphics browser learning driver may learn capabilities of a graphics library associated with the information handling system, and publish learned capabilities of the graphics library. The virtual graphics browser interpreter driver may interpret a user interface input based on published learned capabilities and published learned capabilities of the graphics library, and draw user interface elements on a screen based on interpreted user interface input.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
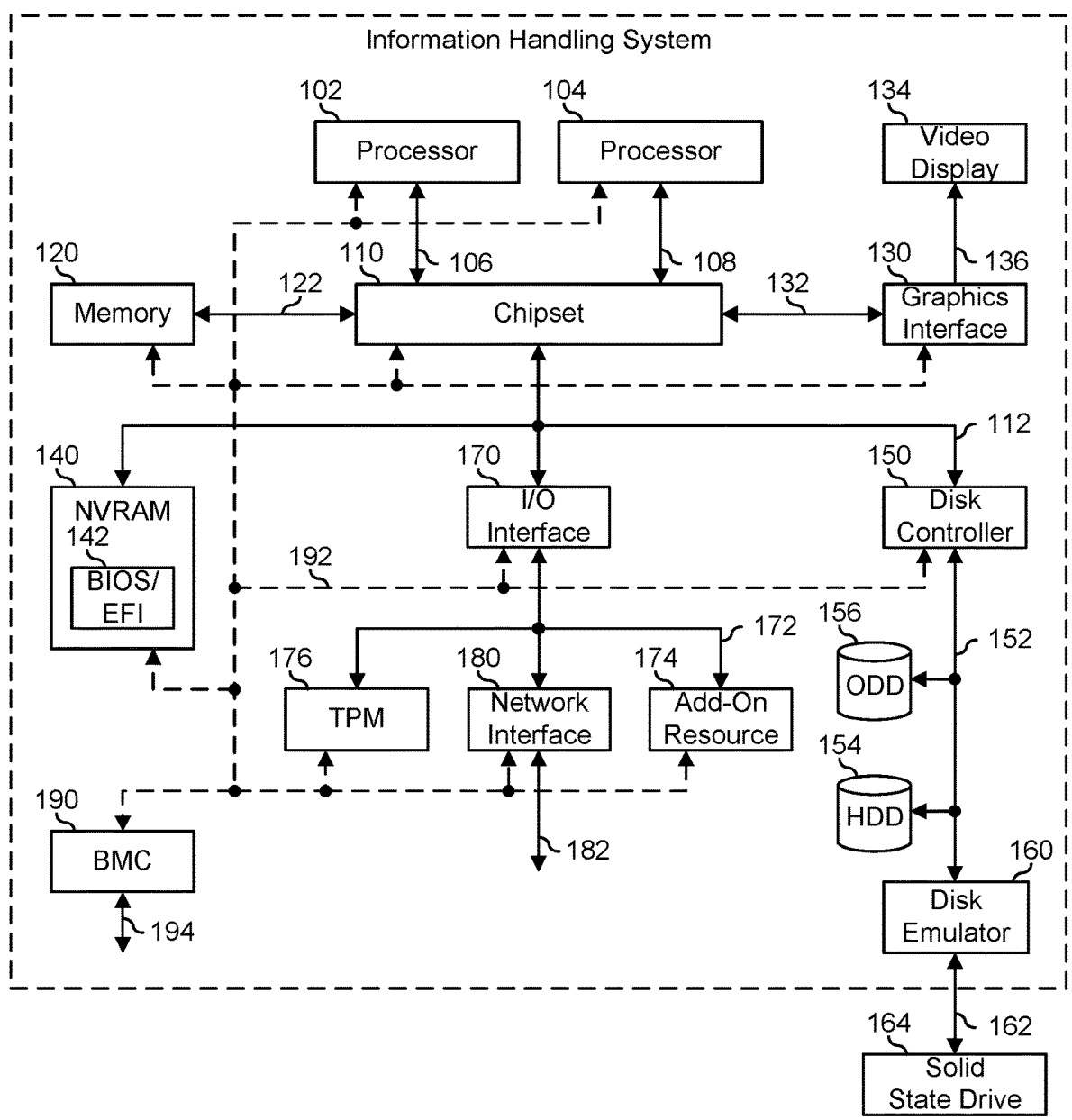
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/unified extensible firmware interface (BIOS/UEFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random-Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface, a Universal Serial Bus (USB), another interface, or a combination thereof. NV-RAM 140 includes BIOS/UEFI module 142 that stores machine-executable code (BIOS/UEFI code) that operates to detect the resources of information handling system 100, to provide drivers for the resources, to initialize the resources, and to provide common access mechanisms for the resources. The functions and features of BIOS/UEFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172 and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller. A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/UEFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by an "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

The UEFI is a specification that defines a software interface between an operating system and platform firmware. Also, the UEFI provides a standard architecture and data structure to manage initialization and configuration of devices, booting of platform resources, and passing control to the operating system which replaces the BIOS found on older information handling systems. For purposes of this disclosure, Extensible Firmware Interface (EFI), UEFI, BIOS/UEFI, and BIOS are used interchangeably.

The UEFI specification allows for the extension of platform firmware by loading UEFI driver and application images. The images may be rendered using standard user interface rendering mechanisms like Representational State Transfer (REST), Extensible Markup Language (XML), and Hypertext Markup Language (HTML). The UEFI has several graphics libraries like Agar, Dell graphics library, and PCI Express Graphics (PEG) that may be used when rendering the image. Dimensions of the image may vary based on the platform, language configuration of the information handling system and screen resolution. Because the image rendered is generally based on a static image file, the image cannot be altered when rendered.

The systems and methods in the present disclosure implement virtual graphics browser configured to collect data or learn the capabilities of various components of the information handling system. Subsequent to learning the capabilities of the various component, the virtual graphics browser may publish the learned capabilities as a platform capability protocol. The virtual graphics browser may utilize the platform capability protocol along with inputs from various sources to render images on a screen. The images are also rendered based on the screen resolution.

Figure 2:
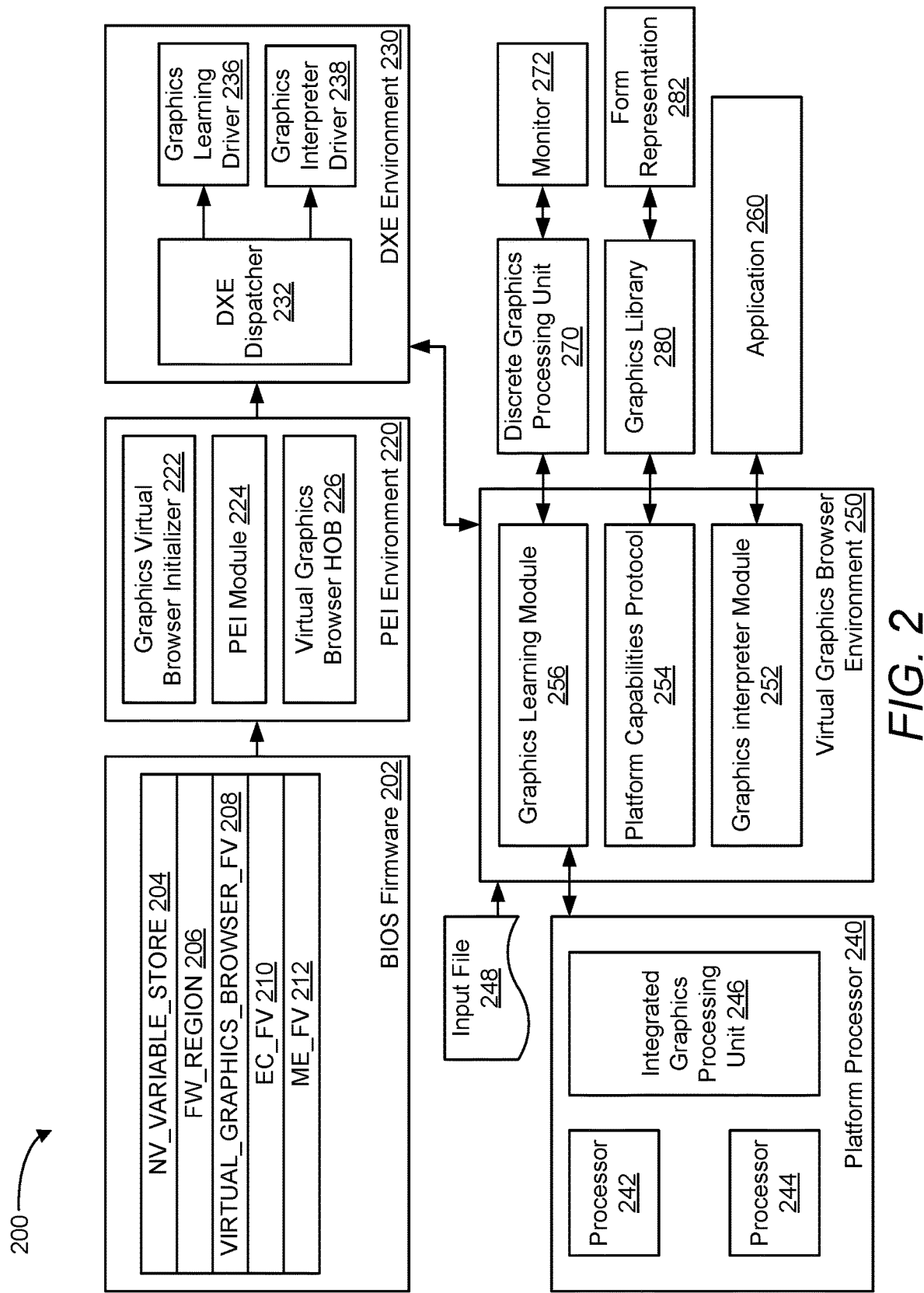
FIG. 2 is a block diagram illustrating an example of a system for pre-boot dynamic video rendering and graphics interpretation by a virtual graphics browser.

FIG. 2 shows a block diagram of a system 200 that illustrates aspects of a graphical virtual graphics browser that may be implemented and utilized in an information handling system similar to information handling system 100 of FIG. 1. System 200 includes a BIOS firmware 202, a pre-EFI initialization (PEI) environment 220, a driver execution environment (DXE) environment 230, an input file 248, a platform processor 240, a virtual graphics browser environment 250, a discrete graphics processing unit 270, a monitor 272, a graphics library 280, a form representation 282, and an application 260.

A flash memory device such as an SPI ROM is a shared memory that may be used to store firmware used during the initialization of the information handling system. The flash memory device may include one or more firmware regions. Each firmware region may include a firmware component such as BIOS firmware 202. A firmware component generally includes a collection of firmware routines, device drivers, and other software programs. BIOS firmware 202 may include a non-volatile variable store 204, a firmware region 206, and one or more firmware volumes such as virtual graphics browser firmware volume 208, an embedded controller firmware volume 210, and a management engine firmware volume 212. A firmware volume is a basic storage data and/or code repository. Each firmware volume is organized into a file system.

By storing the virtual graphics browser firmware volume 208 in the flash memory device, if there are any patches for virtual graphics browser firmware volume 208, then the patches can be delivered without flashing the BIOS. The update can be performed by replacing the virtual graphics browser firmware volume 208 in the flash memory. Also, because the virtual graphics browser module payload is in the shared space of BIOS firmware 202, the aforementioned payload can be leveraged by other components such as embedded controller firmware volume 210 and management engine firmware volume 212. For example, Intel® Management Engine BIOS Extension (MEBX) may access virtual graphics browser firmware volume 208 instead of carrying an additional graphics library.

Specific operations that occur during the stages of a boot process also referred to as initialization of the information handling system can vary from one manufacturer to another. Typically, the initialization can be divided into a sequence of stages or phases including a PEI phase, a DXE phase, and a boot device selection (BDS) phase. The initialization can include additional phases, however, the present disclosure relates to operations generally performed during the PEI phase and the DXE phase, so a discussion of the other phases is omitted for clarity.

The PEI phase includes CPU initialization, chipset initialization, and board resource initialization so that the DXE phase can be loaded and executed. PEI environment 220 includes a virtual graphics browser initializer 222, a PEI module 224, and a virtual graphics browser hand-off block 226 which allocated from a memory cache. Virtual graphics browser initializer 222 may be configured to populate virtual graphics browser hand-off block 226 with payload from virtual graphics browser firmware volume 208 also referred to as virtual graphics browser module payload. Virtual graphics browser's hand-off block 226 may be appended to a hand-off block list that includes information for the DXE to produce its memory-based services.

The DXE phase performs device-specific initializations for the information handling system. There are several components in the DXE phase, including a DXE foundation, a DXE dispatcher such as DXE dispatcher 232, and a set of DXE drivers that includes graphics learning driver 236 and graphics interpreter driver 238. After the DXE foundation is initialized, control is handed to DXE dispatcher 232. DXE dispatcher 232 examines the firmware volumes that are present in the information handling system. DXE dispatcher 232 may be configured to retrieve the virtual graphics browser module payload stored from virtual graphics browser hand-off block 226. DXE dispatcher 232 is responsible for loading and invoking DXE drivers such as graphics learning driver 236 and graphics interpreter driver 238 based on the retrieved virtual graphics browser module payload. Some DXE drivers may depend on the services produced by other DXE drivers, so DXE dispatcher 232 may also dispatch the DXE drivers in the correct order. DXE dispatcher 232 may read the virtual graphics browser module payload in virtual graphics browser hand-off block 226 and dispatch graphics learning driver 236 prior to dispatching graphics interpreter driver 238. Dispatching graphics learning driver 236 and graphics interpreter driver 238 includes loading the virtual graphics browser module payload in the memory and starting graphics learning driver 236 and graphics interpreter driver 238.

Virtual graphics browser environment 250 may be generated after graphics learning driver 236 and graphics interpreter driver 238 has been dispatched by DXE dispatcher 232. Virtual graphics browser environment 250 includes a graphics learning module 256 and a graphics interpreter module 252. Graphics learning module 256 may be configured to learn about the capabilities of various components of the information handling system and publish a platform capabilities protocol 254 based on the learned capabilities. Platform capability protocol 254 can be accessed by UEFI applications also referred to as pre-boot applications like application 260.

In particular, graphics learning module 256 may be configured to learn about the capabilities of the components of platform processor 240, such as a processor 242, a processor 244, and an integrated graphics processor unit 246. Processor 242 and processor 244 may be similar to processor 102 and processor 104 of FIG. 1. In addition, graphics learning module 256 may also be configured to learn the capabilities, such as the supported features, of discrete graphics processing unit 270 and monitor 272 also referred herein as a screen. For example, graphics learning driver 236 may learn whether discrete graphics processing unit 270 can support an XML input file, RESTful APIs, etc. Also, graphics learning driver 236 may learn the capabilities of discrete graphic processing unit 270 and monitor 272. For example, graphics learning driver 236 may learn the supported resolutions of discrete graphics processing unit 270 and the resolution of monitor 272. In addition, graphics learning driver 236 may learn the functional aspects of graphics library 280 which may include PEG library, Agar library, Dell library, etc. In addition, graphics learning driver 236 may learn whether graphics library 280 can interpret various form representations such as form representation 282 that may include visual form representation (VFR) and/or internal form representation (IFR) data. VFR is a language like a syntax for describing forms and pages for BIOS setup such as the user interface screens. IFR is produced when VFR is compiled. IFRs are data structures that are used to describe models of menus of input.

Graphics interpreter module 252 may be configured to provide a consistent look on the screen regardless of resolution, language, or culture. Because an interface element may have different coordinates in a monitor with standard resolution than in another screen with a higher resolution, graphics interpreter module 252 may be configured to generate a fixed frame buffer pixel matrix and create a task-let that may run on a graphics processing unit, such as discrete graphics processing unit 270, to dynamically render the interface element on the screen. The interface element also referred to as draw element, or a user interface element. Graphics interpreter module 252 may be configured to interpret multiple input streams to generate the fixed frame buffer and then to request the graphics processing unit to render the frame buffer on the screen. Also, graphics interpreter module 252 has access to form representation 282 of the interface elements thereby by having more control over the interface elements. In addition, graphics interpreter module 252 may be configured to address internationalization and localization issues. For example, internationalization and/or localization issues may include the direction of the display, punctuation, line breakage, date and time, and numbers. For example, 12,345.67 in one language may be presented as 12.345, 67 in another language.

The graphics interpreter module 252 may be configured to understand the learned capabilities of the platform based on platform capability protocol 254. Graphics interpreter module 252 may be configured to fetch a user interface input or simply an input such as input file 248 from a server based on the learned platform capabilities. Input file 248 may include an operation which may be performed by graphics interpreter module 252 and then send a response back to the server. Graphics interpreter module 252 may also be configured to understand various form representation mechanisms based on one or more user interface inputs that may be used to present the user interface at monitor 272. Platform capability protocol 254 may be configured to generate a user interface dynamic video buffer for application 260 which may include pre-boot applications like BIOS Setup, BIO-SConnect, eDiags, etc.

Graphics interpreter module 252 may be configured to determine or capture the coordinates of interface elements on the screen, which may then be published. The coordinates may be based on the resolution of the screen. For example, coordinates of a widget in a standard resolution screen may be different than the coordinates of the same widget in a high-definition screen. In another example, the coordinates of the widget in one language in a standard resolution screen may be different than the coordinates of the same widget in another language in the same standard resolution screen. Capturing the interface coordinates may be based on VFR or IFR. The captured coordinates may be used in various unattended pre-boot deployment applications or pre-boot applications in varied screen resolutions such as an unattended operating system recovery image download, operating system deployment, and pre-boot operations. In particular, graphics interpreter module 252 may execute operations in the GUIs of the pre-boot applications. The capture of the coordinates may be performed dynamically, wherein if an administrator changes the screen during the pre-boot process; graphics interpreter module 252 may capture the new coordinates based on the new screen without a reset or reboot.

Graphics interpreter module 252 may also be configured to draw a user interface element also referred to as an interface element such as a widget on the screen based on an interpretation of an input such as input file 248. Input file 248 may include a REST file, an XML file, an HTML file, etc. An interface element includes an icon, a font, a scrollbar, etc. The drawing of the interface element may be based on the learned capabilities of the information handling system such as supported platform resolutions, processor capabilities, graphical processing unit capabilities, and monitor capabilities if any. The interface element may be used by a GUI of a pre-boot application such as application 260 wherein the GUI is displayed on the screen or as part of a GUI operation.

Figure 3:
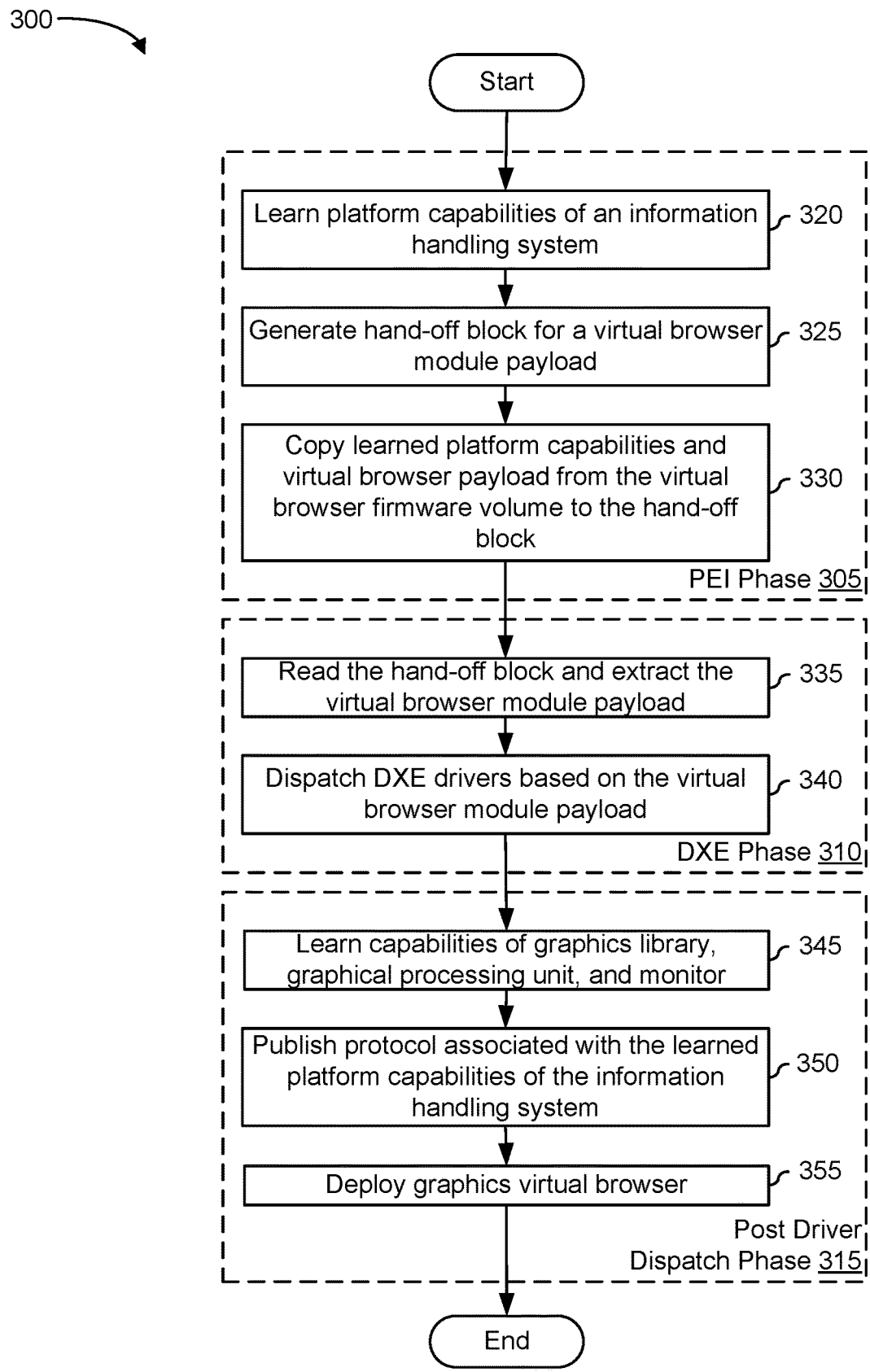
FIG. 3 is a flowchart illustrating an example of a method for initializing a virtual graphics browser.

FIG. 3 illustrates a method 300 for learning platform and graphical capabilities of various components of an information handling system. Method 300 includes PEI phase 305, DXE phase 310, and post driver dispatch phase 315. PEI phase 305 includes block 320, block 325, and block 330. DXE phase 310 includes block 335 and block 340. Post driver dispatch phase 315 includes block 345, block 350, and block 355. Method 300 may be performed by one or more components of FIG. 2. For example, PEI phase 305 and DXE may be performed by the BIOS/UEFI module. Also, post driver dispatch phase 315 may be performed by a graphics learning module.

At block 320, the method may learn the platform capabilities including the capabilities of one or more processors. For example, the method may learn whether the processor is capable of performing video buffer mappings such as I/O mapping or direct memory access (DMA) mapping such as using Intel virtualization technology for directed I/O (VT-D) DMA remap (DMAR) for PCIe discrete GUI. For example, a pseudo driver may be generated to manage the address space of a video card which means the PCIe address space is protected.

At block 325, the method may create a hand-off block for the virtual graphics browser module payload. The hand-off block may be created from a portion of a memory cache. The method then proceeds to block 330 where the method may copy the virtual graphics browser module payload and store it in the hand-off block. The method may also store the learned platform capabilities in the hand-off block.

At block 335, the method may read information in the hand-off block and extract or retrieve the virtual graphics browser payload from the hand-off block. The method proceeds to block 340 where the method dispatches DXE drivers such as a graphics learning driver and graphics interpreter driver based on the virtual graphics browser module payload.

At block 345, the method may learn the capabilities of the graphics library such as learning the functional aspects of the graphics library. The method may learn the supported capabilities of the integrated graphics processing unit and the discrete graphics processing unit. The method may also learn the capabilities of the monitor like its resolution. For example, the method may learn whether the monitor has a standard-definition resolution, an enhanced-definition resolution, a high-definition resolution, an ultra-high-definition resolution, etc.

The method proceeds to block 350 where the method may publish a platform capabilities protocol which includes the learned platform capabilities. The platform capabilities protocol may also include the learned capabilities of the graphics library, the integrated graphics processing unit, the discrete graphics processing unit, and the monitor of the information handling system.

The method proceeds to block 355 where the method deploys a virtual graphics browser that can be used by the pre-boot applications along with the platform capabilities protocol. After deploying the virtual graphics browser, the method ends.

Figure 4:
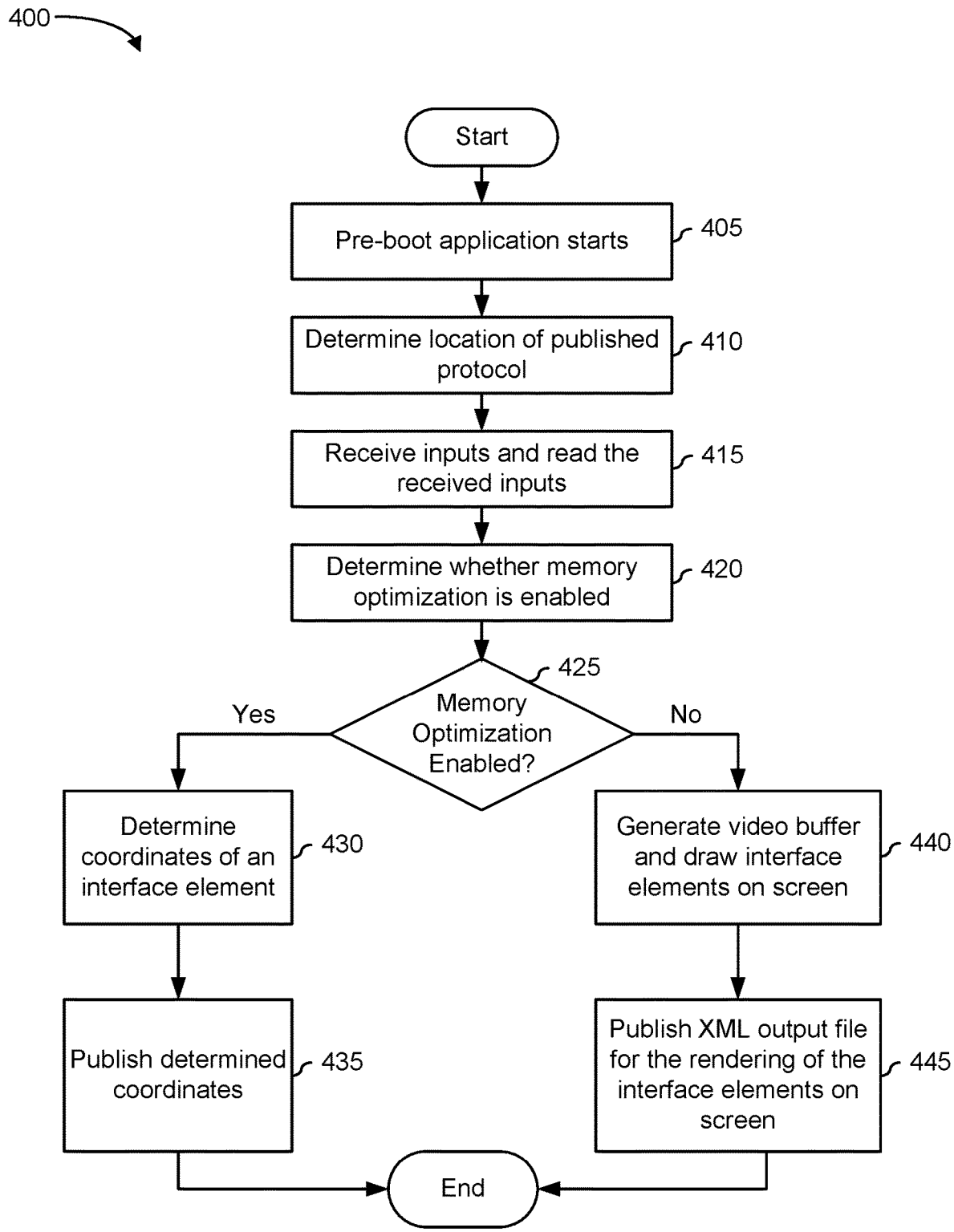
FIG. 4 is a flowchart illustrating an example of a method for interpreting learned capabilities of the various components of an information handling system, according to an embodiment of the present disclosure.

FIG. 4 illustrates a method 400 for interpreting learned capabilities of the various components of an information handling system. Method 400 may be performed by one or more components of system 200 of FIG. 2 such as graphics interpreter module 252. Method 400 may be performed by virtual graphics browser stack in the DXE phase to perform video rendering and XML rendering. Video rendering functionality is to perform GUI operations without manual intervention. XML rendering functionality is to display the UI screen based on user interface inputs such as an XML input. Method 400 may be used to control vendor specific user interface application as per requirements of the platform with the original equipment manufacturer's video interpretation commands. For example, the method can control the user interface rendering of Intel's management engine user interface configuration wizard.

Method 400 may use a virtual graphics browser like interpreter to understand multiple input sources and convert the input sources to a video buffer for rendering a graphical user interface which includes generating screen to widget coordinates for unattended features of a pre-boot application. The method also supports rendering the widget in a multi-language GUI across the varied resolutions. In providing multi-language support, for example, the coordinates for a particular logo in English may be depicted as "x+EN" and "y+EN". If the language is changed, then a delta may be added or removed from the coordinates dynamically, based on the resolution of the monitor.

The method typically starts at block 405, where a pre-boot application such as a pre-boot user interface application or pre-boot deployment application starts. The method then proceeds to block 410 where the method may locate or get an instance of the platform capabilities protocol published by the graphics learning module. The method may query a hand-off block for the location of the published platform capabilities protocol. The method proceeds to block 415 where an input such as a user interface input may be received from one or more sources. In another embodiment, the method may retrieve the input. The input may be an input file such as an XML file, an HTML file, a REST file, etc. from various input sources such via a universal serial bus (USB), Bluetooth, or network. The input may also be output from one or more graphics libraries.

At block 420, the method determines whether memory optimization is enabled. Memory optimization may be enabled by an administrator at setup. The method proceeds to decision block 425 where the method determines whether the memory optimization is enabled. If the memory optimization is enabled, then the "YES" branch is taken, and the method proceeds to block 430. If the memory optimization is not enabled, then the "NO" branch is taken, and the method proceeds to block 440.

At block 430, the method determines the coordinates of an interface element which may then be published at block 435. The published coordinates may be used by zero-touch applications such as operating system deployment application, service operating system recovery application, automated BIOS configuration for troubleshooting issues with system configuration, or similar pre-boot applications irrespective of the graphics library. After publishing the coordinates, the method ends.

At block 440, the method may generate a video buffer and draw interface elements on the screen. The method proceeds to block 445 where the method may publish an output file such as an XML output file for the rendering of the interface elements on the screen. After publishing the output file, the method ends.

Figure 5:
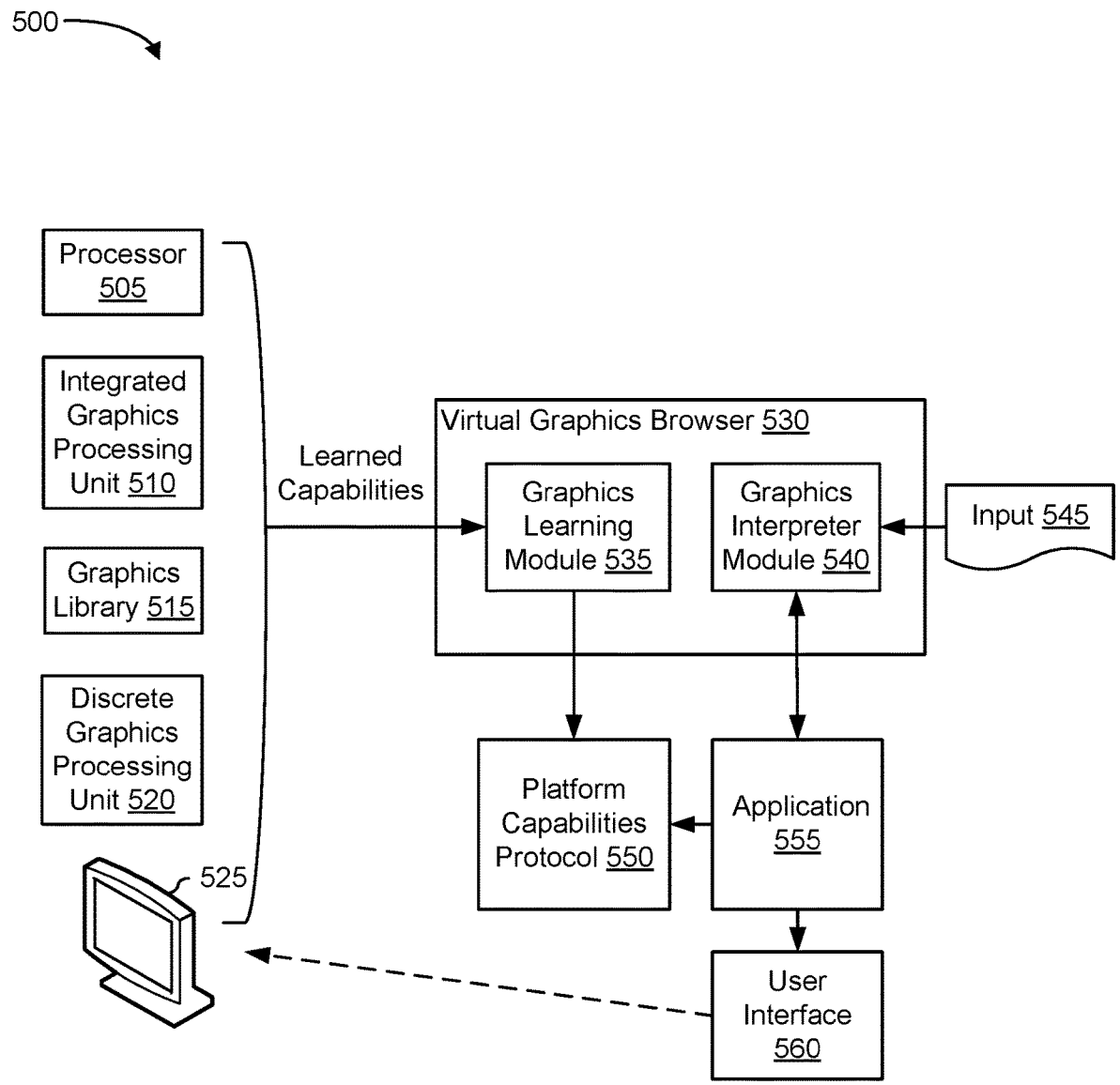
FIG. 5 is a block diagram illustrating an example of a system for pre-boot dynamic video rendering and graphics interpretation by a virtual graphics browser.

FIG. 5 shows a system 500 system for pre-boot dynamic video rendering and graphics interpretations by a virtual graphics browser. System 500 may be part of an information handling system similar to information handling system 100 of FIG. 1. System 500 includes a virtual graphics browser 530, learned capabilities from various components of the information handling system such as a processor 505, an integrated graphics processing unit 510, a graphics library 515, a discrete graphics processing unit 520, and a monitor 525. System 500 also includes an input 545, a platform capabilities protocol 550, an application 555, and a user interface 560.

Virtual graphics browser 530 also referred to as a virtual graphics browser module includes a graphics learning module 535 and a graphics interpreter module 540. Virtual graphics browser 530 may be a lightweight virtual browser that interprets user interface inputs based on learned platform capabilities. For example, virtual graphics browser 530 may be configured to interpret a user interface input file like an XML file, an HTML, file, a REST file, etc., from input sources like universal serial bus, Bluetooth, or a networking source. Virtual graphics browser 530 may be configured to understand different graphics libraries. The graphics libraries may be able to interpret IFR and/or VFR data. Pre-boot applications may leverage virtual graphics browser 530 to dynamically determine the user interface coordinates of interface elements associated with IFR/VFR or XML/HTML/REST user interface methods. The VFR may be parsed given a dynamic representation which is then given to the graphics library. Virtual graphics browser 530 may be configured to render the screen by utilizing the graphics library based on the dynamic representation and the learned platform capabilities.

Virtual graphics browser 530 may also be configured to render interface elements, such as widgets on user interface 560 which is displayed at monitor 525. A widget may be an icon, a font, a button, an image, a scrollbar, etc. based on the current language of the pre-boot application. In addition, virtual graphics browser 530 may be configured to determine the coordinates of the interface elements rendered on the screen. Also, virtual graphics browser 530 may be configured to dynamically learn platform video capability mapping to advanced graphics libraries in UEFI for dynamically obtaining the video pixel map of video elements. Virtual graphics browser 530 may generate an XML file based on the determined coordinates which could be used for zero-touch automation requirements during a pre-boot operation such as an unattended an operating system recovery process.

Because virtual graphics browser 530 may perform some of the work that the processor generally performs, the present disclosure may reduce requests to the processor of the information handling system resulting in the ability of the information handling system to render the screen faster. For example, generally rendering a logo with a size of 120 pixels by 100 pixels on a 4 k ultra high definition (UHD) screen takes approximately 620 microseconds. In comparison, the present disclosure rendered the logo at approximately 106 microseconds, a gain of 514 microseconds without the need to change the graphics library.

Graphics learning module 535 may be configured to learn the capabilities of various components of an information handling system similar to information handling system 100 of FIG. 1. For example, virtual graphics browser 530 may learn the capabilities of processor 505, integrated graphics processing unit 510, graphics library 515, discrete graphics processing unit 520, monitor 525, etc. Graphics learning module 535 may query information regarding several components of the information handling system such as from an inventory, a configuration file, etc. Graphics learning module 535 may be configured to perform an inventory to identify the components. After learning the capabilities of the components, graphics learning module 535 may be configured to publish the learned capabilities, such as platform capabilities protocol 550.

Graphics learning module 535 may learn the capabilities of the components dynamically. For example, if a user changes monitor 525, the graphics learning module 535 may learn the capabilities of the new monitor without the need to reset or re-boot the information handling system. In another example, if the information handling system does not have a discrete graphics processing unit, then graphics interpreter module may determine which screen resolutions that cannot be supported by virtual graphics browser 530.

Graphics interpreter module 540 may be configured to receive one or more inputs from various sources such as input 545. Graphics interpreter module 540 may also be configured to leverage the capabilities of integrated graphics processing unit 510 and/or discrete graphics processing unit 520 in balancing the load of processor 505 based on the published learned platform capabilities. Graphics interpreter module 540 may be configured to interpret the data of input 545 based on the learned capabilities of integrated graphics processing unit 510 and/or discrete graphics processing unit 520 and the learned capabilities of graphics library 515. For example, graphics interpreter module 540 may interpret VFR/IFR data. In addition, graphics interpreter module 540 may be configured to perform alterations to a video buffer by parsing the input files.

Input 545 may include an IFR used for running a pre-boot setup. Input 545 may also include external representations of the forms and derivations of these representations that are used to pass configuration information to applications such as application 555. The forms may be expressed using various standards such as REST, extensible HTML (XHTML), XML, HTML, JavaScript Object Notation (JSON), VFR, IFR, etc. A form is a description of a page or pages which describe fields for user input.

Although FIG. 3, and FIG. 4 show example blocks of method 300 and method 400 in some implementation, method 300 and method 400 may include additional blocks, fewer blocks, different blocks, or differently arranged blocks than those depicted in FIG. 3 and FIG. 4. Additionally, or alternatively, two or more of the blocks of method 300 and method 400 may be performed in parallel. For example, block 410 and block 415 of method 400 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
 during a pre-extensible firmware interface initialization phase of booting an information handling system:
  creating, by a processor, a hand-off block for a payload of a virtual graphics browser firmware volume;
  copying the payload of the virtual graphics browser firmware volume to the hand-off block; and during a driver execution environment phase of the booting of the information handling system:
  dispatching driver execution environment drivers that includes loading the payload of the virtual graphics browser firmware volume in memory;
  generating a virtual graphics environment to learn capabilities of components of the information handling system;
  publishing, by the payload of the driver execution environment drivers, a platform capabilities protocol from learned capabilities of the components of the information handling system, wherein the platform capabilities protocol is accessible by unified extensible firmware interface; and
  deploying a virtual graphics browser that includes a virtual graphics browser learning driver and a virtual graphics browser interpreter driver, wherein the virtual graphics browser is configured to perform an alteration to a video buffer by parsing an input file that includes an extensible markup language file, an hypertext markup language file, a representational state transfer file, and wherein the virtual graphics browser is further configured to map the learned capabilities of the components to the learned capabilities of a graphics library for determining a video pixel map of video elements.

2. The method of claim 1, further comprising generating a user interface video buffer for a pre-boot user interface application based on the published platform capabilities protocol.

3. The method of claim 1, further comprising determining coordinates of user interface elements based on visual form representation or internal form representation.

4. The method of claim 1, wherein the published platform capabilities protocol is utilized by a pre-boot application when generating a user interface screen.

5. The method of claim 1, wherein the virtual graphics browser is further configured to render a multi-language user interface element on a plurality of monitor resolutions.

6. The method of claim 1, wherein the components include a particular processor, a graphics processing unit, and a monitor.

7. The method of claim 1, further comprising generating the video buffer for a pre-boot application, wherein the video buffer can be input/output mapped or memory mapped.

8. A non-transitory computer-readable medium including code that when executed by a processor cause the processor to perform a method, the method comprising:
  creating a hand-off block for a payload of a virtual graphics browser firmware volume;
  copying the payload of the virtual graphics browser firmware volume to the hand-off block;
  dispatching driver execution environment drivers that include loading the payload of the virtual graphics browser firmware volume in memory;
  generating a virtual graphics environment to learn capabilities of components of an information handling system;
  publishing, by the payload of the driver execution environment drivers, a platform capabilities protocol from learned capabilities of the components of the information handling system, wherein the platform capabilities protocol is accessible by unified extensible firmware interface; and
  deploying a virtual graphics browser that includes a virtual graphics browser learning driver and a virtual graphics browser interpreter driver, wherein the virtual graphics browser is configured to perform an alteration to a video buffer by parsing an input file that includes an extensible markup language file, a hypertext markup language file, a representational state transfer file, and wherein the virtual graphics browser is further configured to map the learned capabilities of the components to the learned capabilities of a graphics library for determining a video pixel map of video elements.

9. The non-transitory computer-readable medium of claim 8, wherein the virtual graphics browser is for use by pre-boot applications along with the platform capabilities protocol.

10. The non-transitory computer-readable medium of claim 9, wherein the method further comprises determining coordinates of user interface elements based on visual form representation or internal form representation.

11. The non-transitory computer-readable medium of claim 10, wherein the virtual graphics browser is further configured to render a multi-language user interface element on a plurality of monitor resolutions.

12. The non-transitory computer-readable medium of claim 10, wherein the virtual graphics browser is further configured to render a user interface screen based on a visual form representation or an internal form representation.

13. The non-transitory computer-readable medium of claim 10, wherein the virtual graphics browser is further configured to determine user interface coordinates of interface elements.

14. A non-transitory computer-readable medium including code that when executed by a processor cause the processor to perform a method, the method comprising:
  locating a platform capabilities protocol published during a driver execution environment phase at booting of an information handling system;
  in response to determining that memory optimization is enabled:
    determining coordinates of user interface elements based on a language associated with a user interface input;
    publishing the coordinates of the user interface elements for a zero-touch application, wherein the coordinates may be used by the zero-touch application; and
  in response to determining that the memory optimization is disabled then:
    generating a video buffer for rendering user interface elements on a display screen; and
    publishing an output file for the user interface elements.

15. The non-transitory computer-readable medium of claim 14, wherein the user interface input includes an extensible markup language file, an hypertext markup language file, a representational state transfer file.

16. The non-transitory computer-readable medium of claim 14, wherein a graphics library is configured to interpret data of one of a visual form representation and an internal forms representation.

17. The non-transitory computer-readable medium of claim 14, further comprising when a first monitor with a first resolution is replaced with a second monitor with a second resolution, then dynamically generating user interface coordinates of the user interface elements based on the second resolution of the second monitor.

18. The non-transitory computer-readable medium of claim 14, wherein the output file is an extensible markup language file.

19. The non-transitory computer-readable medium of claim 14, wherein the user interface input is received from a source that includes one of a universal serial bus, Bluetooth, or a local area network.

20. The non-transitory computer-readable medium of claim 14, wherein the rendering of the user interface elements of a pre-boot application is performed based on one or more languages.

* * * * *